(12) United States Patent
Dai et al.

(10) Patent No.: US 12,526,838 B2
(45) Date of Patent: Jan. 13, 2026

(54) INDICATION OF TBS SCALING AND REPETITION FOR MSG4 PDSCH

(71) Applicant: QUALCOMM Incorporated, San Diego, CA (US)

(72) Inventors: Jing Dai, Beijing (CN); Jing Lei, San Diego, CA (US); Chao Wei, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 450 days.

(21) Appl. No.: 18/005,341

(22) PCT Filed: Sep. 28, 2020

(86) PCT No.: PCT/CN2020/118391
§ 371 (c)(1),
(2) Date: Jan. 12, 2023

(87) PCT Pub. No.: WO2022/061881
PCT Pub. Date: Mar. 31, 2022

(65) Prior Publication Data
US 2023/0269778 A1 Aug. 24, 2023

(51) Int. Cl.
*H04W 74/00* (2009.01)
*H04W 74/04* (2009.01)
*H04W 74/0833* (2024.01)
*H04W 74/0836* (2024.01)

(52) U.S. Cl.
CPC ......... *H04W 74/006* (2013.01); *H04W 74/04* (2013.01); *H04W 74/0833* (2013.01); *H04W 74/0836* (2024.01)

(58) Field of Classification Search
None
See application file for complete search history.

(56) References Cited

U.S. PATENT DOCUMENTS

| | | | |
|---|---|---|---|
| 2016/0270038 A1* | 9/2016 | Papasakellariou | H04L 1/1896 |
| 2017/0280481 A1* | 9/2017 | Stern-Berkowitz | H04W 74/0833 |
| 2019/0312708 A1* | 10/2019 | Bai | H04W 68/02 |
| 2019/0372719 A1* | 12/2019 | Talarico | H04L 1/189 |
| 2023/0225005 A1* | 7/2023 | Park | H04W 76/30 370/329 |
| 2023/0269778 A1* | 8/2023 | Dai | H04W 74/04 370/329 |
| 2024/0179787 A1* | 5/2024 | Park | H04W 76/27 |

FOREIGN PATENT DOCUMENTS

| | | |
|---|---|---|
| CN | 110809902 A | 2/2020 |
| CN | 111629449 A | 9/2020 |

OTHER PUBLICATIONS

Intel Corporation: "On Coverage Recovery for RedCap NR UEs", 3GPP TSG RAN WG1 Meeting #102_E, R1-2005882, e-Meeting, Aug. 17-28, 2020, Sections 1-4, pp. 1-8.

(Continued)

*Primary Examiner* — Faiyazkhan Ghafoerkhan
(74) *Attorney, Agent, or Firm* — Patterson & Sheridan LLP

(57) ABSTRACT

Aspects of the present disclosure relate to wireless communications, and more particularly, to techniques and mechanisms for indicating transport block size (TBS) scaling and/or repetition for a Msg4 physical downlink shared channel (PDSCH).

35 Claims, 19 Drawing Sheets

(56) References Cited

OTHER PUBLICATIONS

International Search Report and Written Opinion—PCT/CN2020/118391—ISA/EPO—Jun. 29, 2021.
Qualcomm Incorporated: "Coverage Recovery for RedCap Devices", 3GPP TSG-RAN WG1 Meeting #102-e, R1-2006813, pp. 1-16, e-Meeting, Aug. 17-28, 2020, the Whole Document.
NEC: "Discussion on Coverage Recovery and Capacity Impact", 3GPP TSG RAN WG1 #102-e, R1-2005757, 3rd Generation Partnership Project, Mobile Competence Centre, 650, Route Des Lucioles, F-06921 Sophia-Antipolis Cedex, France, vol. RAN WG1, No. e-Meeting Aug. 17-Aug. 28, 2020, Aug. 7, 2020, 2 pages, XP052347130.
Qualcomm Incorporated: "Coverage Recovery for RedCap Devices", 3GPP TSG-RAN WG1 Meeting #102-e, R1-2007081, 3rd Generation Partnership Project, Mobile Competence Centre, 650, Route Des Lucioles, F-06921 Sophia-Antipolis Cedex, France, vol. RAN WG1, No. e-Meeting, Aug. 17-Aug. 28, 2020, Aug. 21, 2020, 17 pages, XP052348449, Section 1, Section 5.1.4.
Supplementary European Search Report—EP20954731—Search Authority—The Hague—May 16, 2024.
Ericsson: "Higher-Layer Aspects for Redcap", 3GPP TSG-RAN WG1 Meeting #101-e, R1-2003292, e-Meeting, May 25-Jun. 5, 2020, May 16, 2020, pp. 1-8.
Moderator (Qualcomm Inc): "FL Summary #3 on Coverage Recovery and Capacity Impact for NR RedCap", 3GPP TSG RAN WG1 #102-e, R1-2007312, e-Meeting, Aug. 17-Aug. 28, 2020, Aug. 29, 2020, pp. 1-23.

\* cited by examiner

MCS Index Table for PDSCH

| MCS Index $I_{MCS}$ | Modulation Order $Q_m$ | Target code Rate R x [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

FIG. 10A

MCS Index Table for PDSCH

| MCS Index $I_{MCS}$ | Modulation Order $Q_m$ | Target code Rate R x [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

| TBS scaling field | Scaling factor |
|---|---|
| 00 | 1 |
| 01 | 0.5 |
| 10 | 0.25 |
| 11 | |

FIG. 12

Release 15 Msg4 DCI

DCI Format 1_0 with CRC Masked by TC-RNTI

| Field | Bit Width |
|---|---|
| Identifier of DCI formats | 1 |
| Frequency Domain Resource Assignment | Variable |
| Time Domain Resource Assignment | 4 |
| VRB-to-PRB Mapping | 1 |
| MCS | 5 |
| NDI | 1 |
| RV | 2 |
| HARQ Process Number | 4 |
| DAI | 2 |
| TPC for PUCCH | 2 |
| PUCCH Resource Indicator | 3 |
| PDSCH to HARQ FB Timing Indicator | 3 |

Release 17 RedCap

| | |
|---|---|
| MCS | 5 or 3 |
| TB Scaling for msg4 PDSCH | 2 |
| 0 or TB Scaling for msg4 PDSCH | 2 |

Arrow 2B → MCS / TB Scaling for msg4 PDSCH
Arrow 2A → 0 or TB Scaling for msg4 PDSCH

FIG. 16

| DAI field | Alt 1: Repetition for Msg4 PDSCH | Alt2: Joint indication of MCS table and repetition for Msg4 PDSCH |
|---|---|---|
| 00 | 1 | High-SE MCS table, no repetition |
| 01 | 2 reps | Low-SE MCS table, no repetition |
| 10 | 4 reps | Low-SE MCS table, 2 reps |
| 11 | 8 reps | Low-SE MCS table, 4 reps |

FIG. 17

INDICATION OF TBS SCALING AND REPETITION FOR MSG4 PDSCH

CROSS-REFERENCE TO RELATED APPLICATIONS

This application is a national stage application under 35 U.S.C. 371 of PCT/CN2020/118391, filed Sep. 28, 2020, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques and mechanisms for indicating transport block size (TBS) scaling and/or repetition for a Msg4 physical downlink shared channel (PDSCH).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure may provide advantages, such as improved reliability of message decoding and reduced complexity of decoding.

Certain aspects provide a method for wireless communication by a user equipment (UE). The method generally includes indicating, to a network entity, at least one of a limited capability of the UE or a request for coverage enhancement for a random access channel (RACH) procedure suitable for the limited capability of the UE, determining one or more transmission parameters to achieve a reduced coding rate suitable for the limited capability of the UE, for a physical downlink shared channel (PDSCH) subsequent random access (RA) message, received after a random access response (RAR) message, as part of a random access channel (RACH) procedure, and processing the PDSCH in accordance with the determined transmission parameters.

Certain aspects provide a method for wireless communication by a network entity. The method generally includes receiving, from a user equipment (UE), an indication of at least one of a limited capability of the UE or a request for coverage enhancement for a random access channel (RACH) procedure suitable for the limited capability of the UE, determining one or more transmission parameters to achieve a reduced coding rate suitable for the limited capability of the UE, for a physical downlink shared channel (PDSCH) subsequent random access (RA) message, received after a random access response (RAR) message, as part of the RACH procedure, and transmitting the PDSCH to the UE in accordance with the determined transmission parameters.

Aspects of the present disclosure provide means for, apparatus, processors, and computer-readable mediums for performing the methods described herein.

Aspects of the present disclosure provide means for, apparatus, processors, and computer-readable mediums for performing techniques and methods that may be complementary to the operations by the UE described herein, for example, by a BS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 10A and 10B show example MCS index tables for PDSCH, in accordance with certain aspects of the present disclosure.

FIG. 11 is a table comparing 2-step RACH and 4-step RACH, in accordance with certain aspects of the present disclosure.

FIG. 12 illustrates an example of PDSCH repetition, in accordance with certain aspects of the present disclosure.

FIG. 16 is set of tables illustrating repurpose of modulation and coding scheme (MCS) and downlink assignment index (DAI) fields for transport block size (TBS), in accordance with certain aspects of the present disclosure.

FIG. 17 is a table illustrating how scaling and repetition can be signaled via bits of a TBS scaling field, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
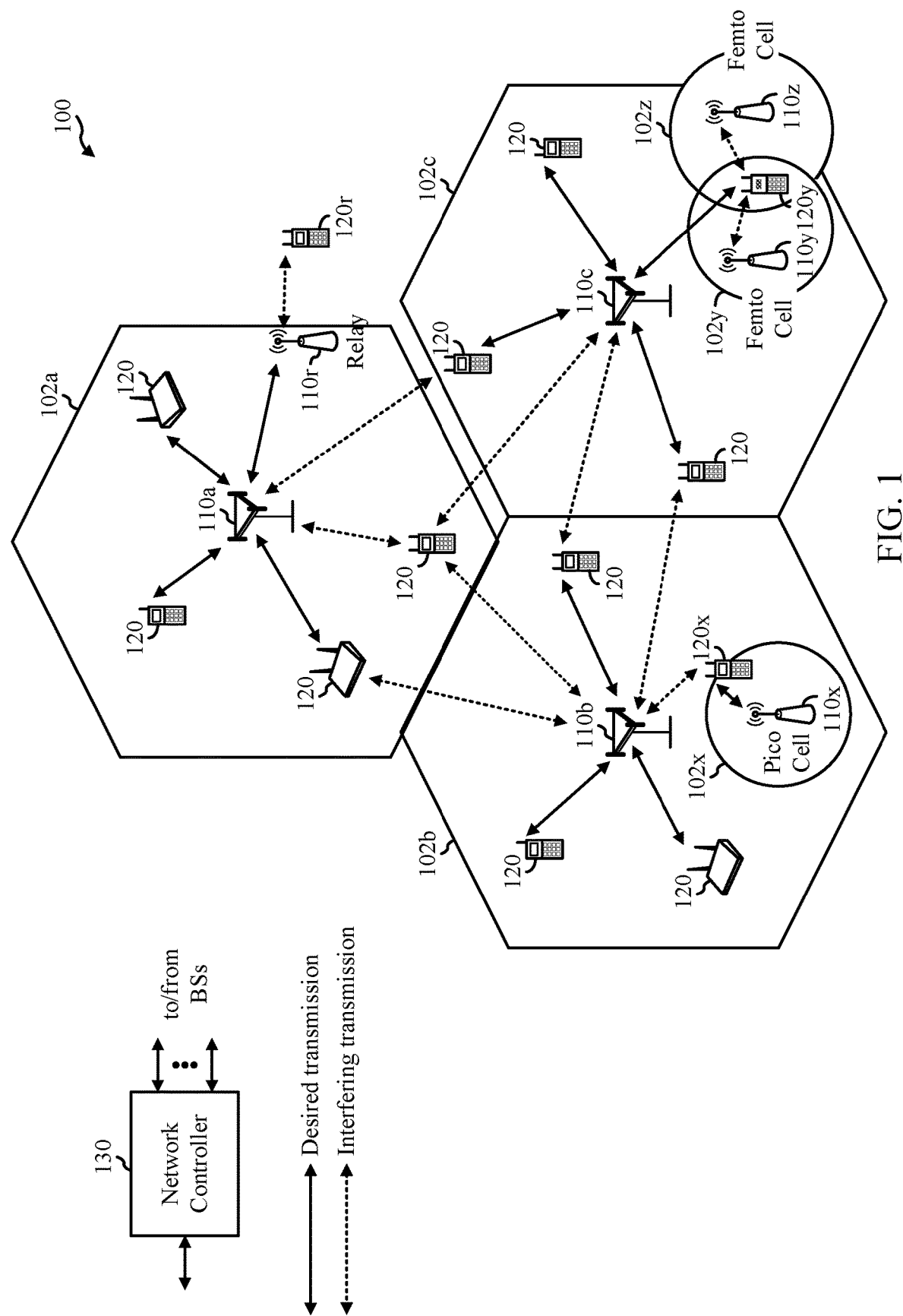
FIG. 1 is a block diagram conceptually illustrating an example telecommunications system, in accordance with certain aspects of the present disclosure.

Aspects of the present disclosure relate to wireless communications, and more particularly, to techniques and mechanisms for indicating transmission parameters, such as transport block size (TBS) scaling and/or repetition, for a physical downlink shared channel (PDSCH) transmission of a random access channel procedure (e.g., Msg4 PDSCH). The transmission parameters may be chosen to enhance reliability for a UE with limited capability, such as a reduced capability (RedCap) UE.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, a UE 120 may be configured to perform operations 1300 of FIG. 13 to determine transmission parameters for a Msg4 PDSCH. Similarly, a base station 110 may be configured to perform operations 1400 of FIG. 14 to indicate the transmission parameters for Msg4 PDSCH to a UE (e.g., performing operations 1300 of FIG. 13).

As illustrated in FIG. 1, the wireless communication network 100 may include a number of base stations (BSs) 110 and other network entities. ABS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
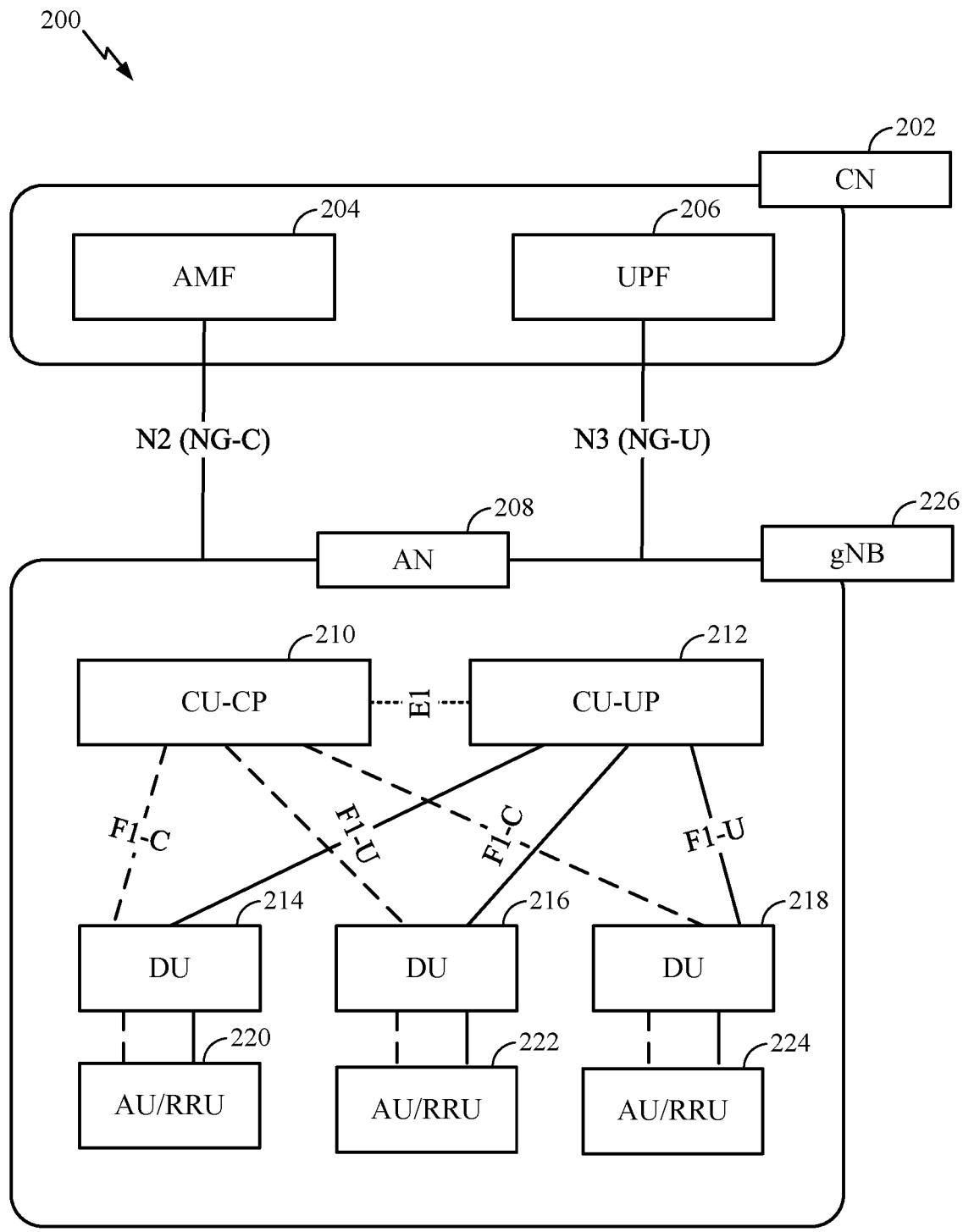
FIG. 2 is a block diagram illustrating an example architecture of a distributed radio access network (RAN), in accordance with certain aspects of the present disclosure.

FIG. 2 illustrates an example architecture of a distributed Radio Access Network (RAN) 200, which may be implemented in the wireless communication network 100 illustrated in FIG. 1. As shown in FIG. 2, the distributed RAN includes Core Network (CN) 202 and Access Node 208.

The CN 202 may host core network functions. CN 202 may be centrally deployed. CN 202 functionality may be offloaded (e.g., to advanced wireless services (AWS)), in an effort to handle peak capacity. The CN 202 may include the Access and Mobility Management Function (AMF) 204 and User Plane Function (UPF) 206. The AMF 204 and UPF 206 may perform one or more of the core network functions.

The AN 208 may communicate with the CN 202 (e.g., via a backhaul interface). The AN 208 may communicate with the AMF 204 via an N2 (e.g., NG-C) interface. The AN 208 may communicate with the UPF 208 via an N3 (e.g., NG-U) interface. The AN 208 may include a central unit-control plane (CU-CP) 210, one or more central unit-user plane (CU-UPs) 212, one or more distributed units (DUs) 214-218, and one or more Antenna/Remote Radio Units (AU/RRUs) 220-224. The CUs and DUs may also be referred to as gNB-CU and gNB-DU, respectively. One or more components of the AN 208 may be implemented in a gNB 226. The AN 208 may communicate with one or more neighboring gNBs.

The CU-CP 210 may be connected to one or more of the DUs 214-218. The CU-CP 210 and DUs 214-218 may be connected via a F1-C interface. As shown in FIG. 2, the CU-CP 210 may be connected to multiple DUs, but the DUs may be connected to only one CU-CP. Although FIG. 2 only illustrates one CU-UP 212, the AN 208 may include multiple CU-UPs. The CU-CP 210 selects the appropriate CU-UP(s) for requested services (e.g., for a UE).

The CU-UP(s) 212 may be connected to the CU-CP 210. For example, the DU-UP(s) 212 and the CU-CP 210 may be connected via an E1 interface. The CU-CP(s) 212 may connected to one or more of the DUs 214-218. The CU-UP(s) 212 and DUs 214-218 may be connected via a F1-U interface. As shown in FIG. 2, the CU-CP 210 may be connected to multiple CU-UPs, but the CU-UPs may be connected to only one CU-CP.

A DU, such as DUs 214, 216, and/or 218, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214-216 may be connected with one of AU/RRUs 220-224.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using Bearer Context Management functions. Data forwarding between CU-UP(s) 212 may be via an Xn-U interface.

The distributed RAN 200 may support fronthauling solutions across different deployment types. For example, the RAN 200 architecture may be based on transmit network capabilities (e.g., bandwidth, latency, and/or jitter). The distributed RAN 200 may share features and/or components with LTE. For example, AN 208 may support dual connectivity with NR and may share a common fronthaul for LTE and NR. The distributed RAN 200 may enable cooperation between and among DUs 214-218, for example, via the CU-CP 212. An inter-DU interface may not be used.

Logical functions may be dynamically distributed in the distributed RAN 200. As will be described in more detail with reference to FIG. 3, the Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in the AN and/or UE.

Figure 3:
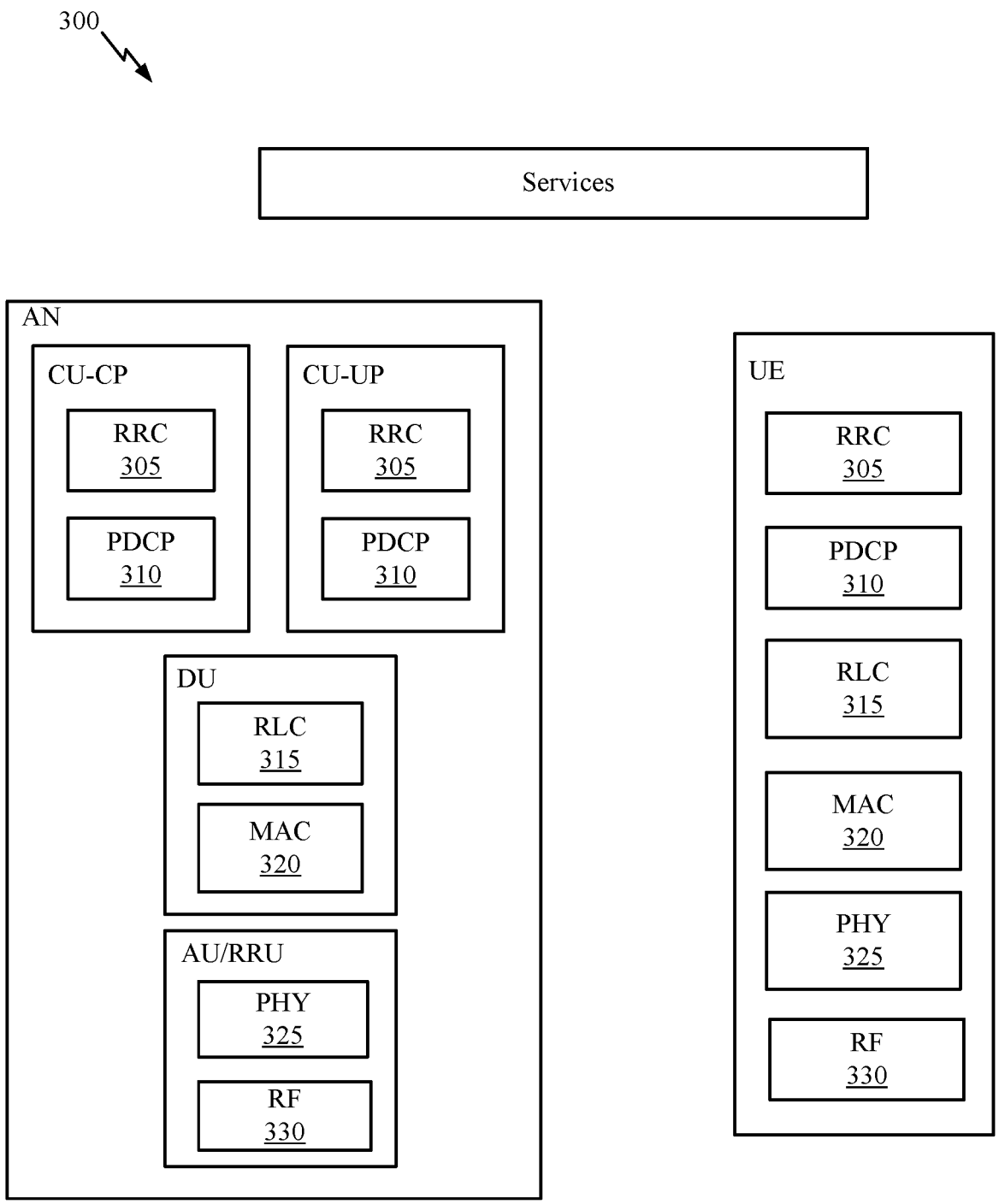
FIG. 3 is a block diagram showing examples for implementing a communication protocol stack in the example RAN architecture, in accordance with certain aspects of the present disclosure.

FIG. 3 illustrates a diagram showing examples for implementing a communications protocol stack 300 in a RAN (e.g., such as the RAN 200), according to aspects of the present disclosure. The illustrated communications protocol stack 300 may be implemented by devices operating in a wireless communication system, such as a 5G NR system (e.g., the wireless communication network 100). In various examples, the layers of the protocol stack 300 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 3, the system may support various services over one or more protocols. One or more protocol layers of the protocol stack 300 may be implemented by the AN and/or the UE.

As shown in FIG. 3, the protocol stack 300 is split in the AN (e.g., AN 208 in FIG. 2). The RRC layer 305, PDCP layer 310, RLC layer 315, MAC layer 320, PHY layer 325, and RF layer 530 may be implemented by the AN. For example, the CU-CP (e.g., CU-CP 210 in FIG. 2) and the CU-UP e.g., CU-UP 212 in FIG. 2) each may implement the RRC layer 305 and the PDCP layer 310. A DU (e.g., DUs 214-218 in FIG. 2) may implement the RLC layer 315 and MAC layer 320. The AU/RRU (e.g., AU/RRUs 220-224 in FIG. 2) may implement the PHY layer(s) 325 and the RF layer(s) 330. The PHY layers 325 may include a high PHY layer and a low PHY layer.

The UE may implement the entire protocol stack 300 (e.g., the RRC layer 305, the PDCP layer 310, the RLC layer 315, the MAC layer 320, the PHY layer(s) 325, and the RF layer(s) 330).

Figure 4:
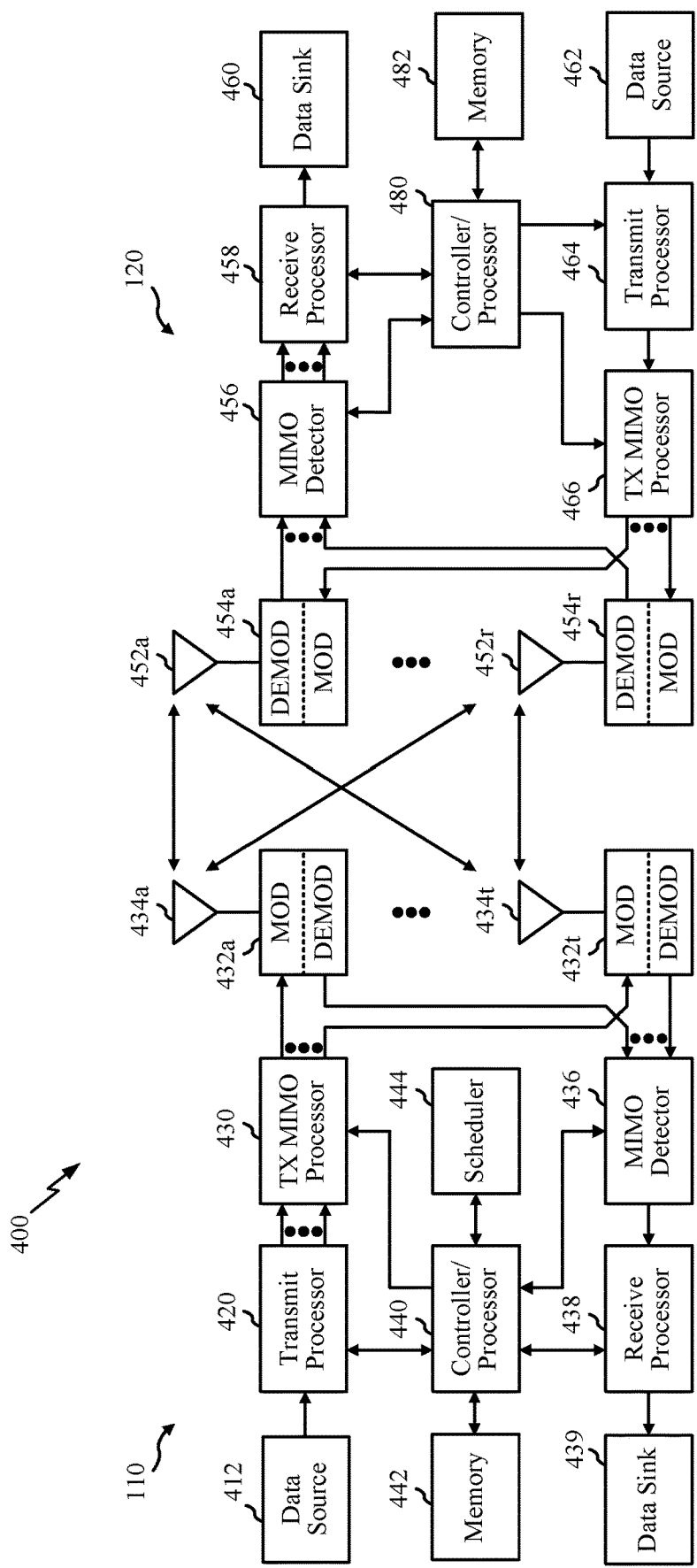
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 may be configured to perform the operations described with respect to FIG. 13, while similar processors of BS 110 may perform operations described with respect to FIG. 14.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DEMODs) in transceivers 454*a* through 454*r*, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
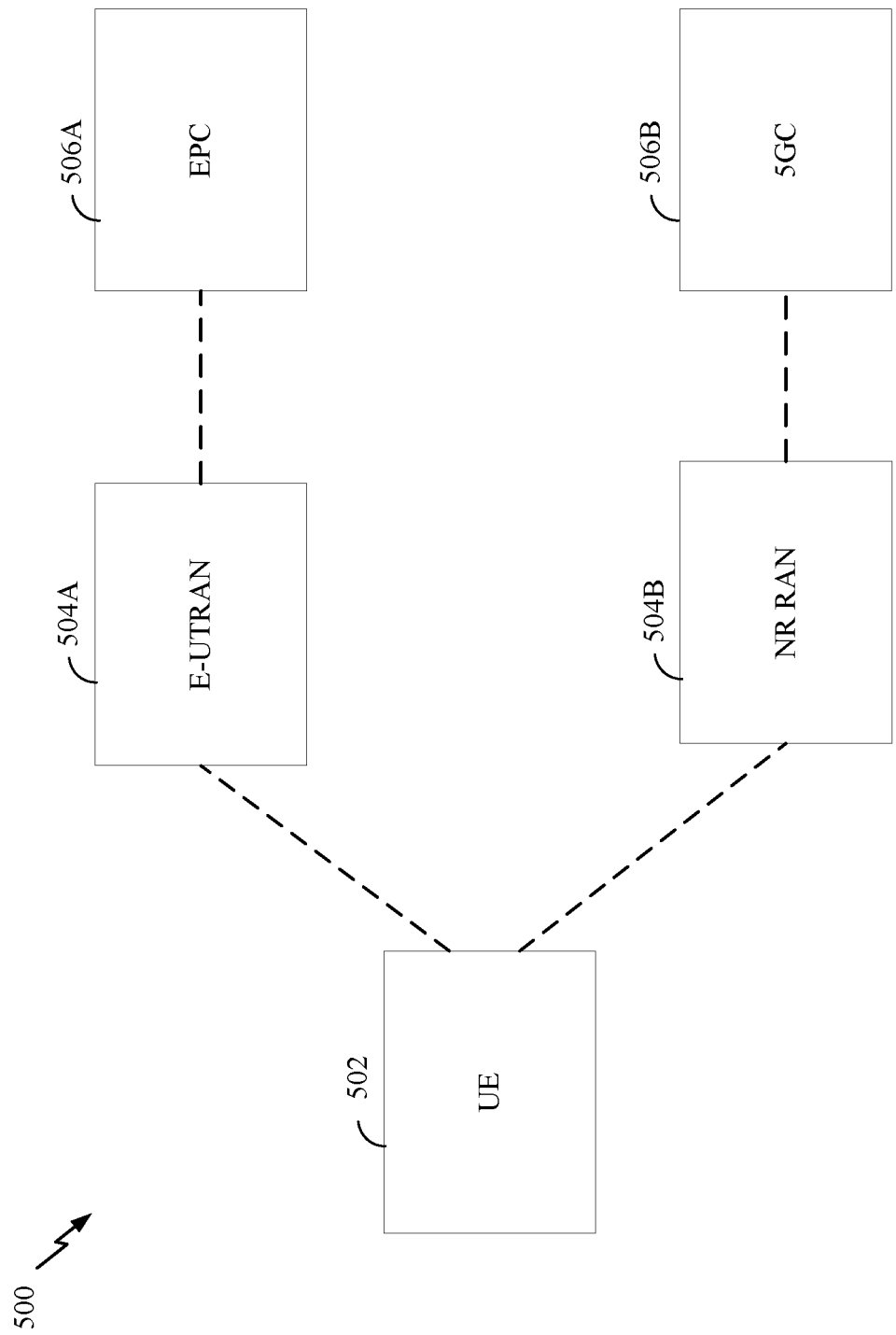
FIG. 5 illustrates an example system architecture for interworking between a 5G System (5GS) and an evolved universal mobile telecommunication system network (E-UTRAN) system, in accordance with certain aspects of the present disclosure.

FIG. 5 illustrates an example system architecture 500 for interworking between 5GS (e.g., such as the distributed RAN 200) and E-UTRAN-EPC, in accordance with certain aspects of the present disclosure. As shown in FIG. 5, the UE 502 may be served by separate RANs 504A and 504B controlled by separate core networks 506A and 506B, where the RAN 504A provides E-UTRA services and RAN 504B provides 5G NR services. The UE may operate under only one RAN/CN or both RANs/CNs at a time.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, ... slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
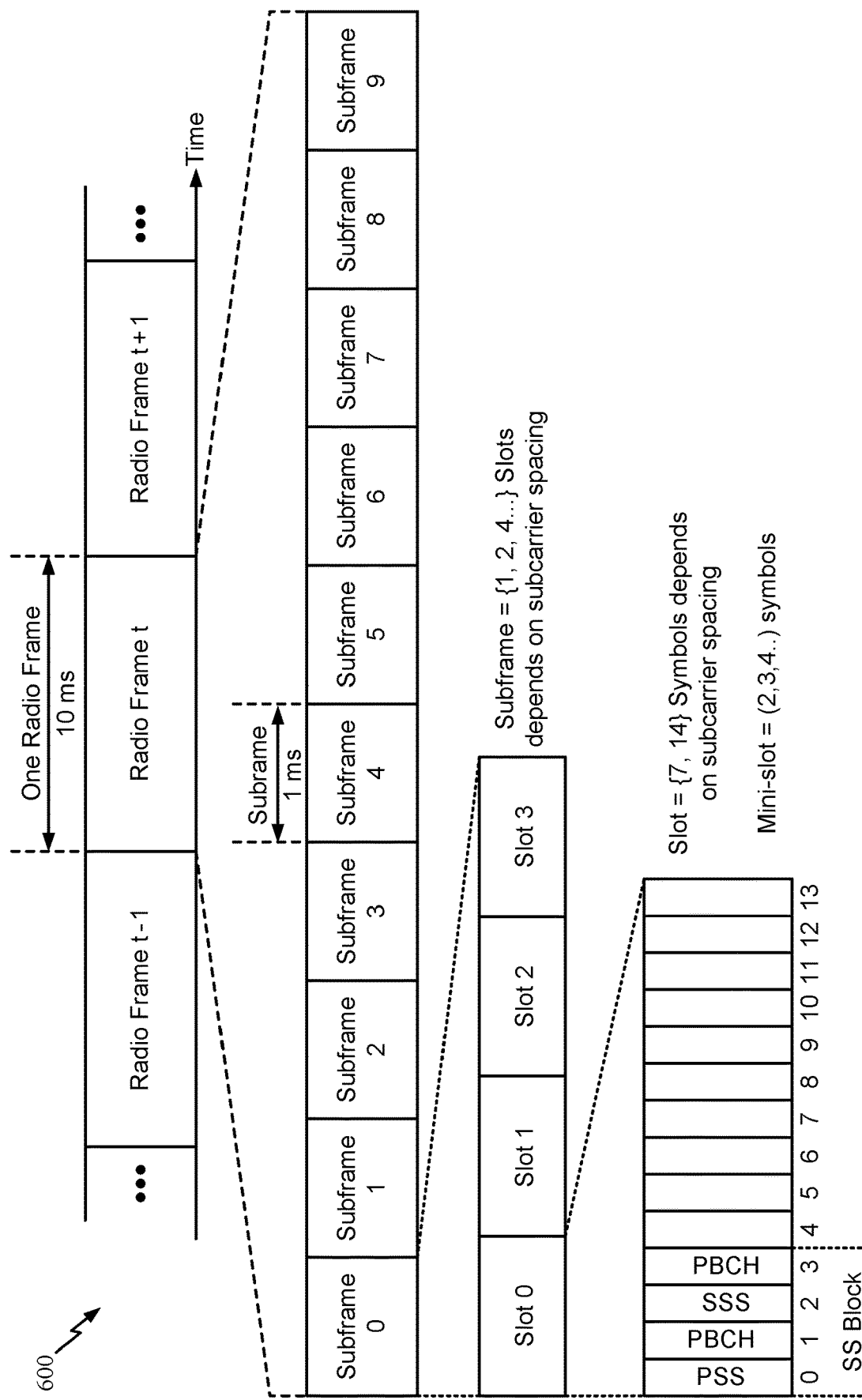
FIG. 6 illustrates an example of a frame format for a telecommunication system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example RACH Procedures

A random-access channel (RACH) is so named because it refers to a wireless channel (medium) that may be shared by multiple UEs and used by the UEs to (randomly) access the network for communications. For example, the RACH may be used for call setup and to access the network for data transmissions. In some cases, RACH may be used for initial access to a network when the UE switches from a radio resource control (RRC) connected idle mode to active mode, or when handing over in RRC connected mode. Moreover, RACH may be used for downlink (DL) and/or uplink (UL) data arrival when the UE is in RRC idle or RRC inactive modes, and when reestablishing a connection with the network.

Figure 7:
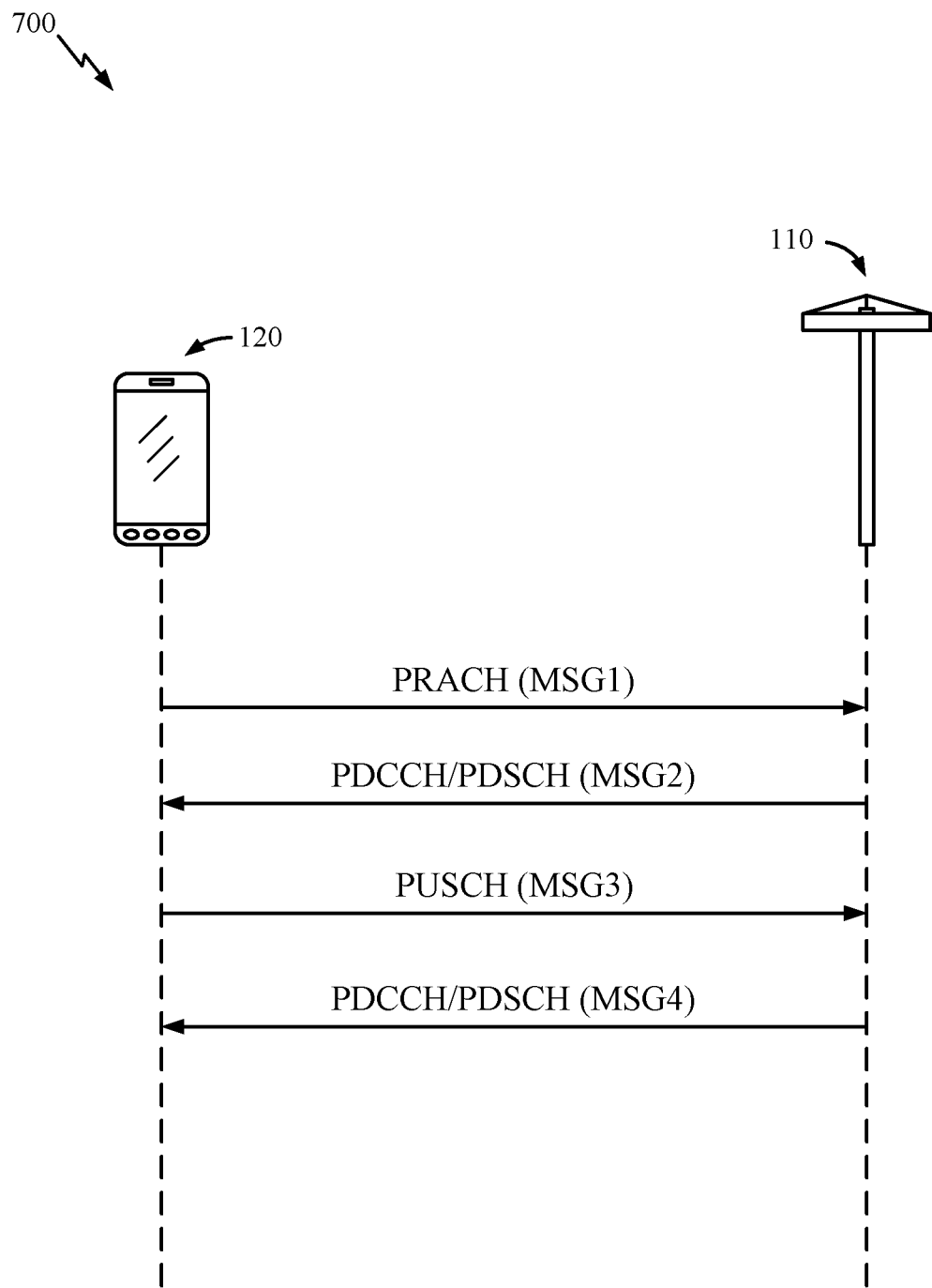
FIG. 7 is a timing diagram illustrating an example four-step RACH procedure, in accordance with certain aspects of the present disclosure.

FIG. 7 is a timing (or "call-flow") diagram 700 illustrating an example four-step RACH procedure, in accordance with certain aspects of the present disclosure. A first message (MSG1) may be sent from the UE 120 to BS 110 on the physical random access channel (PRACH). In this case, MSG1 may only include a RACH preamble. BS 110 may respond with a random access response (RAR) message (MSG2) which may include the identifier (ID) of the RACH preamble, a timing advance (TA), an uplink grant, cell radio network temporary identifier (C-RNTI), and a back off indicator. MSG2 may include a PDCCH communication including control information for a following communication on the PDSCH, as illustrated. In response to MSG2, MSG3 is transmitted from the UE 120 to BS 110 on the PUSCH. MSG3 may include one or more of a RRC connection request, a tracking area update request, a system information request, a positioning fix or positioning signal request, or a scheduling request. The BS 110 then responds with MSG4 which may include a contention resolution message.

In some cases, to speed access, a two-step RACH procedure may be supported. As the name implies, the two-step RACH procedure may effectively "collapse" the four messages of the four-step RACH procedure into two messages.

Figure 8:
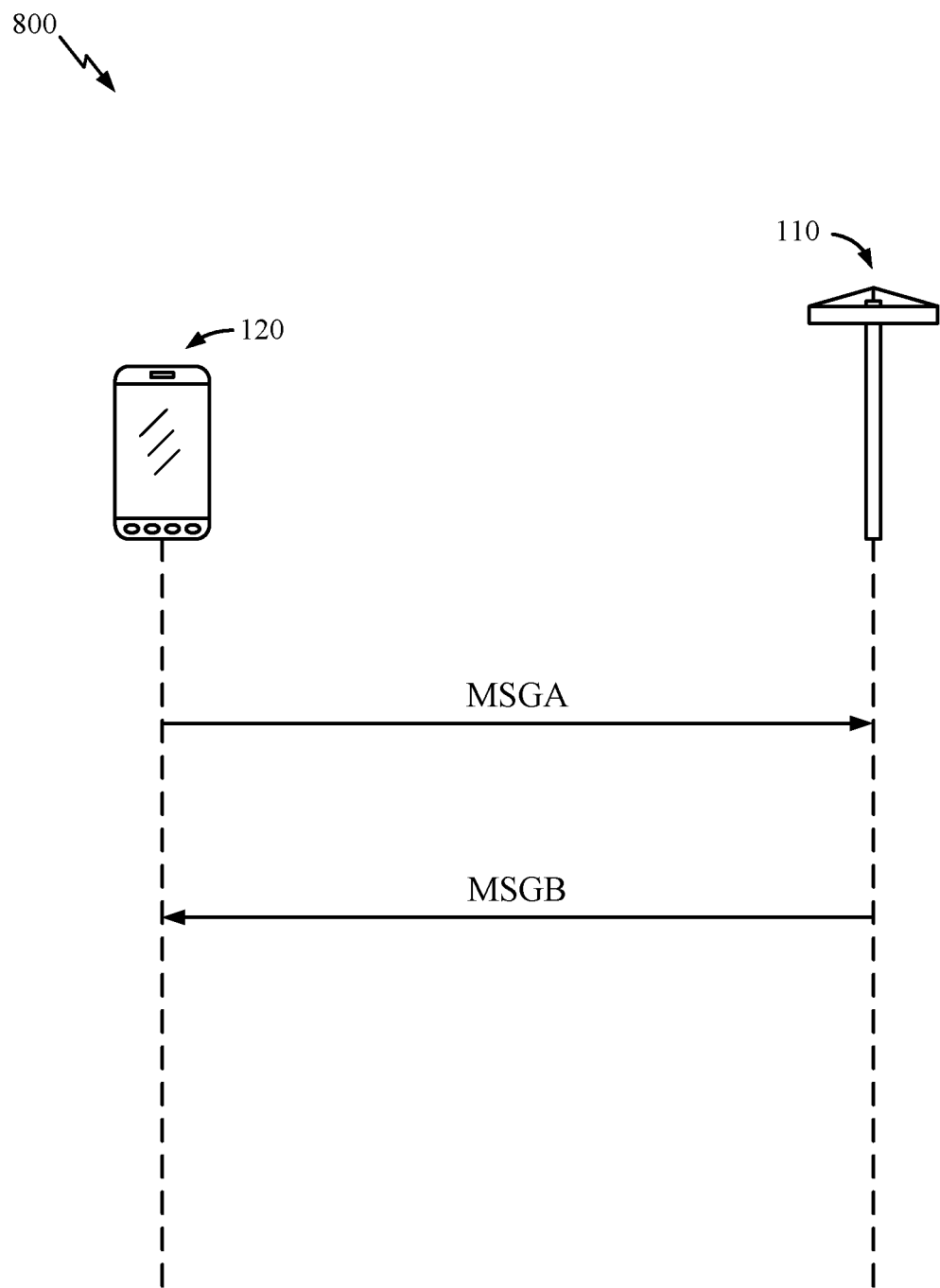
FIG. 8 is a timing diagram illustrating an example two-step RACH procedure, in accordance with certain aspects of the present disclosure.

FIG. 8 is a timing diagram 800 illustrating an example two-step RACH procedure, in accordance with certain aspects of the present disclosure. A first enhanced message (msgA) may be sent from the UE 120 to BS 110. In certain aspects, msgA includes some or all the information from MSG1 and MSG3 from the four-step RACH procedure, effectively combining MSG1 and MSG3. For example, msgA may include MSG1 and MSG3 multiplexed together such as using one of time-division multiplexing or frequency-division multiplexing. In certain aspects, msgA includes a RACH preamble for random access and a payload. The msgA payload, for example, may include the UE-ID and other signaling information (e.g., buffer status report (BSR)) or scheduling request (SR). BS 110 may respond with a random access response (RAR) message (msgB) which may effectively combine MSG2 and MSG4 described above. For example, msgB may include the ID of the RACH preamble, a timing advance (TA), a back off indicator, a contention resolution message, UL/DL grant, and transmit power control (TPC) commands.

In a two-step RACH procedure, the msgA may include a RACH preamble and a payload. In some cases, the RACH preamble and payload may be sent in a msgA transmission occasion.

The random access message (msgA) transmission occasion generally includes a msgA preamble occasion (for transmitting a preamble signal) and a msgA payload occasion for transmitting a PUSCH. The msgA preamble transmission generally involves:
(1) selection of a preamble sequence; and
(2) selection of a preamble occasion in time/frequency domain (for transmitting the selected preamble sequence).

The msgA payload transmission generally involves:
(1) construction of the random access message payload (DMRS/PUSCH); and
(2) selection of one or multiple PUSCH resource units (PRUs) in time/frequency domain to transmit this message (payload).

In some cases, a UE monitors SSB transmissions which are sent (by a gNB using different beams) and are associated with a finite set of time/frequency resources defining RACH occasions (ROs) and PRUs. As will be described in greater detail below, upon detecting an SSB, the UE may select an RO and one or more PRUs associated with that SSB for a msgA transmission. The finite set of ROs and PRUs may help reduce monitoring overhead (blind decodes) by a base station.

There are several benefits to a two-step RACH procedure, such as speed of access and the ability to send a relatively small amount of data without the overhead of a full four-step RACH procedure to establish a connection (when the four-step RACH messages may be larger than the payload).

The two-step RACH procedure can operate in any RRC state and any supported cell size. Networks that uses two-step RACH procedures can typically support contention-based random access (CBRA) transmission of messages (e.g., msgA) within a finite range of payload sizes and with a finite number of MCS levels.

Various technologies may be the focus of current wireless communication standards. For example, Rel-15 and/or Rel-16 may focus on premium smartphones (e.g., enhanced mobile broadband (eMBB)), and other verticals such as ultra-reliable low latency communication (URLLC) and/or vehicle-to-everything (V2X) communications. In some wireless communication standards (e.g., Rel-17 and beyond) there may exists a strong desire for new radio (NR) to be scalable and deployable in a more efficient and cost-effective way. Thus, a new UE type with reduced capabilities (RedCap) has been introduced. In particular, a RedCap UE may exhibit a general relaxation of peak throughput, as well as lower latency and/or reliability requirements.

Figure 9:
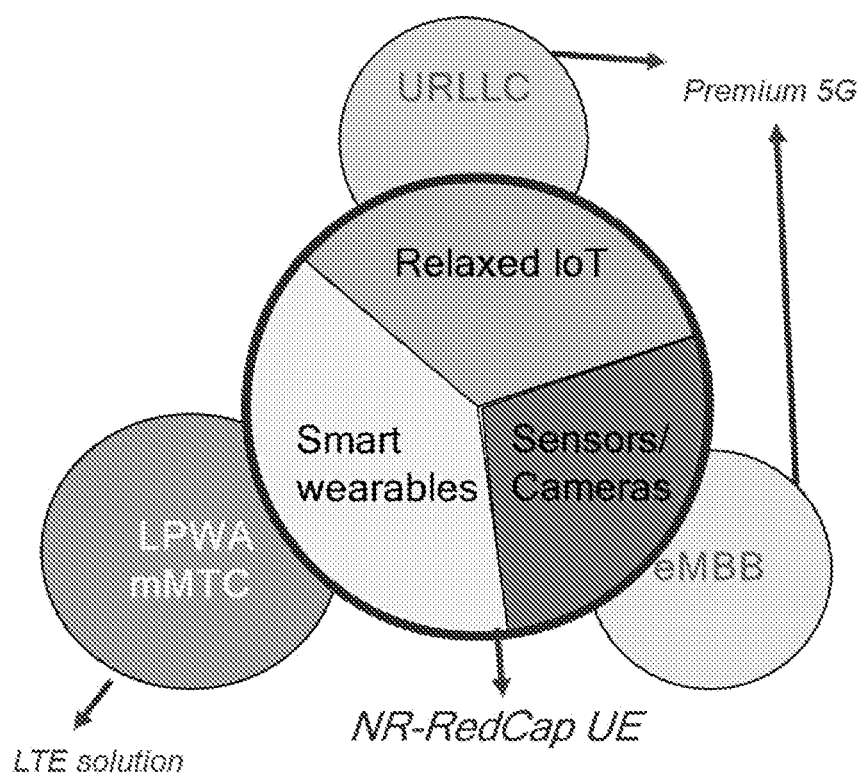
FIG. 9 illustrates capabilities of various types of UEs, in accordance with certain aspects of the present disclosure.

Thus, some design objectives of the NR RedCap UE may include scalable resource allocation, coverage enhancement for DL and/or UL, power saving in all RRC states, and/or co-existence with the NR premium UE. As shown in FIG. 9, an NR-RedCap UE may be a smart wearable device, a sensor/camera, or any other device configured for relaxed internet-of-things (IoT) communications. Further, a RedCap UE functionality and/or capability may overlap with those of long term evolution (LTE) and/or fifth generation (5G) devices (e.g., premium 5G devices). For example, the functionality of relaxed IoT devices may overlap with that of URLLC devices, the functionality of smart wearable devices may overlap with that of low power wide area (LPWA) massive machine type communication (mMTC) devices, and/or the functionality of sensors/cameras may overlap with that of eMBB devices.

In some cases, one of the reduced capabilities for NR-Light UE is the reduced maximum bandwidth (BW) support. In Rel-15 and/or Rel-16, it may be required for the UE to support the maximum channel BWs defined for the band (e.g., 50 MHz for 15 kHz subcarrier spacing (SCS) and 100 MHz for 30/60 kHz SCS for Band n78 (3300 MHz-3800 MHz)). In Rel-17 NR-light, a smaller bandwidth capability may be required (e.g. 20 MHz in frequency range FR1).

The techniques presented herein may be applied in various bands utilized for NR. For example, for the higher band referred to as FR4 (e.g., 52.6 GHz-114.25 GHz), an OFDM waveform with very large subcarrier spacing (960 kHz-3.84 MHz) is required to combat severe phase noise. Due to the large subcarrier spacing, the slot length tends to be very short. In a lower band referred to as FR2 (24.25 GHz to 52.6 GHz) with 120 kHz SCS, the slot length is 125 μSec, while in FR4 with 960 kHz, the slot length is 15.60 μSec.

Example TBS Scaling and Repetition Indication for Msg4 PDSCH

Aspects of the present disclosure relate to wireless communications, and more particularly, to techniques and mechanisms for indicating transmission parameters, such as TBS scaling and/or repetition, for a Msg4 PDSCH. The transmission parameters may be chosen to enhance reliability for a UE with limited capability, such as a RedCap UE.

The techniques presented herein may be used in certain candidate traffic scenarios, for example, involving devices with reduced capability (e.g., NR light devices). Such devices include devices used for industrial wireless sensors, video surveillance, and smart wearables.

In some cases, to support devices with different capabilities, different modulation and coding scheme (MCS) tables may be supported. For example, for MCS with highest modulation order 64QAM, a regular MCS table (shown in FIG. 10A) and a low-SE MCS table (shown in FIG. 10B) may be supported.

Figures 10B, 11:
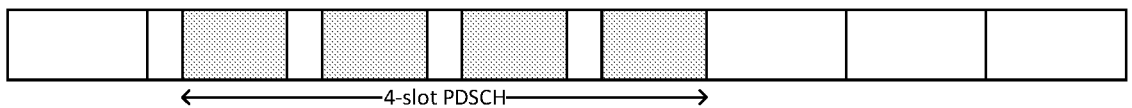

The regular table of FIG. 10A is specified in Rel-15, and can be seen as a basic MCS table, which is considered mandatory for NR UE. The low-SE table of FIG. 10B, added later in Rel-16 to support the URLLC feature for higher transmission reliability, is considered optional for NR UE. In addition, another MCS table with highest modulation order 256QAM is also considered mandatory for Rel-15/16 UEs, but may not be supported by RedCap UEs, because the maximum mandatory modulation of RedCap UEs may be relaxed to 64QAM.

In 5G NR, repeated transmission of PDSCH over successive slots (also referred to as slot-repetition/-aggregation, or multi-slot PDSCH), as illustrated in FIG. 11, is supported to increase the transmission reliability. In such cases, the MCS and resource allocation may be indicated in scheduling DCI, and are common over the successive slots.

For each slot of the multi-slot PDSCH, the transmission block (TB) is the same, but the encoded bits can differ as the redundancy version (RV) of each slot can be different. The RV of the $1^{st}$ slot may be indicated in the scheduling DCI, while the RV of the $n^{th}$ slot is determined by 'n mod 4.' Referring to the 4-slot PDSCH example shown in FIG. 11, exemplary RV sequence over slots, for a new transmission may be {RV0, RV2, RV3, RV1} and for a retransmission may be {RV3, RV1, RV0, RV2}.

The transmission reliability during initial access is often the bottleneck for coverage, which may become more critical for RedCap UE with smaller BW support and reduced number of antennas. To improve the transmission reliability, transmission block size (TBS) scaling for a lower coding rate (with a scaling factor<1), or repeated transmissions may be used. In some systems, TBS scaling may be supported for some random access channel (RACH) messages, such as Msg 2 PDSCH, with a dedicated TBS scaling field indicated in the scheduling DCI (e.g., indicated by CRC masked by RA-RNTI). FIG. 12 illustrates a table of example TBS scaling factors that may be signaled via a TBS scaling field (of a scheduling DCI).

Aspects of the present disclosure provide additional techniques and mechanisms for indicating transmission parameters, such as TBS scaling and/or repetition, for other types of RACH messages, such as a Msg4 PDSCH, which may help enhance reliability for a UEs with limited capability, such as a RedCap UEs. The techniques may help support RedCap UEs which may not support a large enough TBS of Msg4 (e.g. 130 bytes) with a small scaling factor (e.g. 0.25) in single slot.

Figure 13:
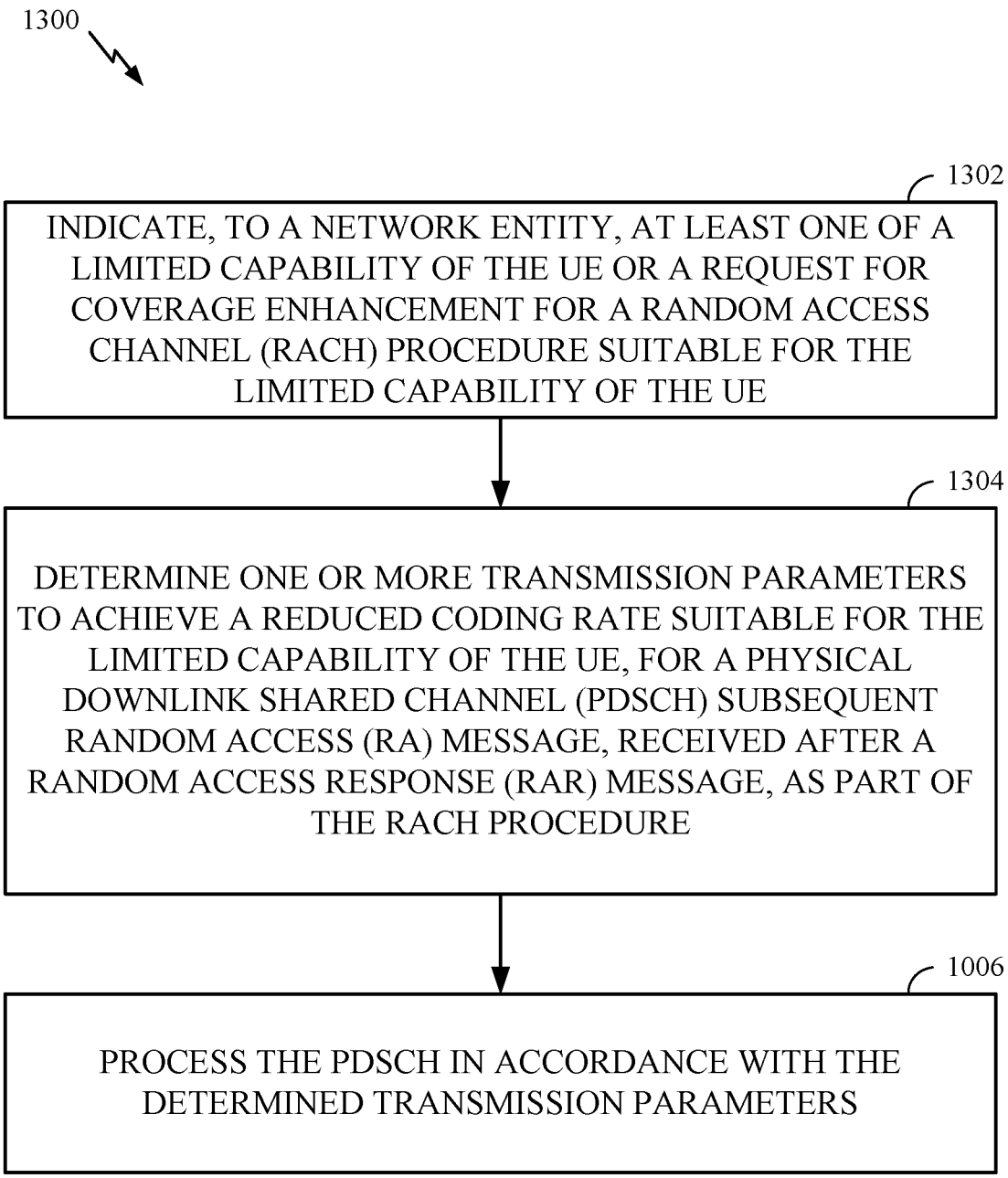
FIG. 13 illustrates example operations for wireless communication by a UE, in accordance with certain aspects of the present disclosure.

FIG. 13 is a flow diagram illustrating example operations 1300 for wireless communication, in accordance with certain aspects of the present disclosure. The operations 1300 may be performed, for example, by a UE (e.g., such as a UE 120a in the wireless communication network 100) to determine TBS scaling and/or a repetition factor for a Msg4 PDSCH.

Operations 1300 begin, at 1302, by indicating, to a network entity, at least one of a limited capability of the UE or a request for coverage enhancement for a random access channel (RACH) procedure suitable for the limited capability of the UE.

At 1304, the UE determines one or more transmission parameters to achieve a reduced coding rate suitable for the limited capability of the UE, for a physical downlink shared channel (PDSCH) subsequent random access (RA) message, received after a random access response (RAR) message, as part of a random access channel (RACH) procedure.

At 1306, the UE processes the PDSCH in accordance with the determined transmission parameters.

Figure 14:
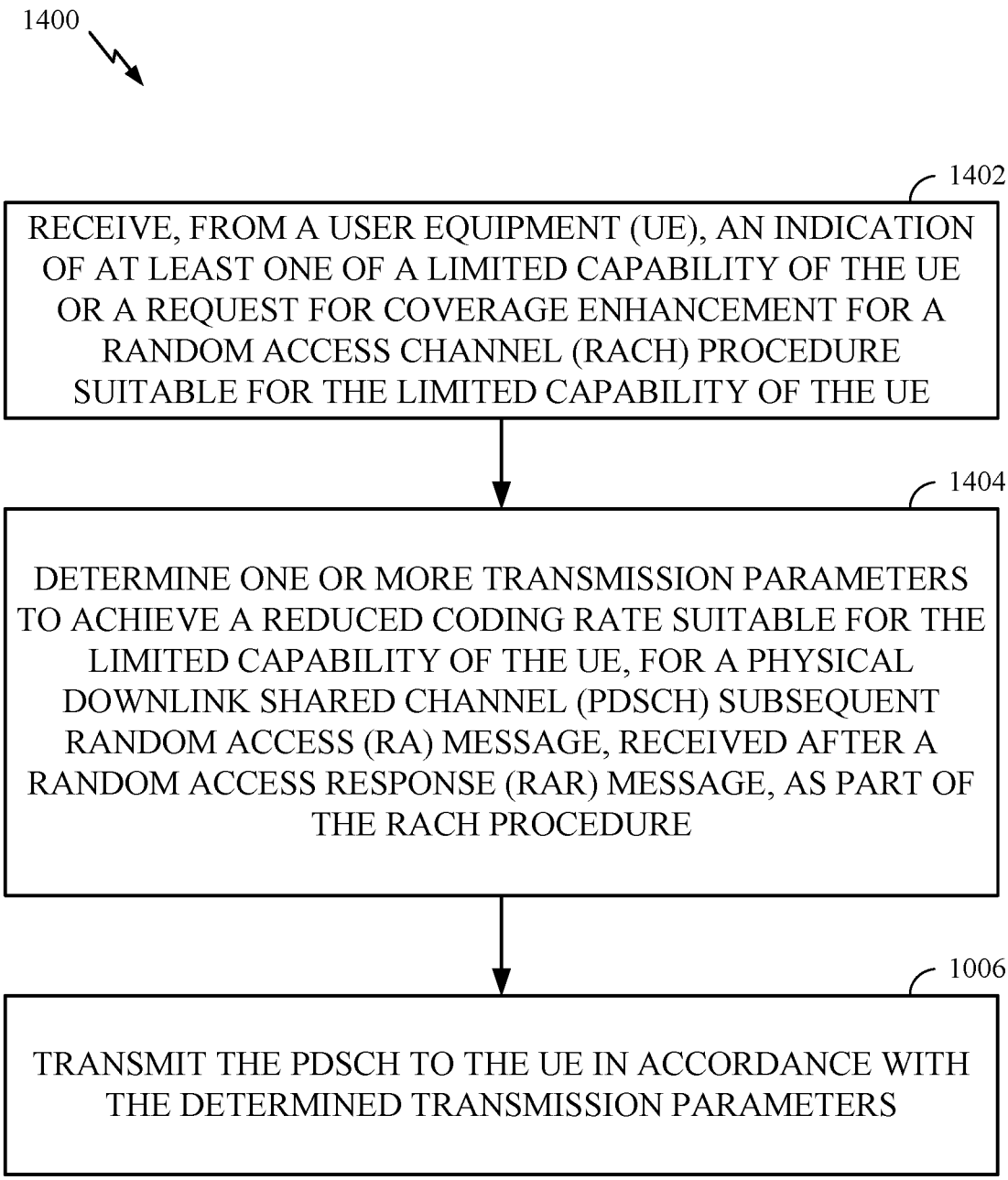
FIG. 14 illustrates example operations for wireless communication by a network entity, in accordance with certain aspects of the present disclosure.

FIG. 14 is a flow diagram illustrating example operations 1400 for wireless communication by a network entity and may be considered complementary to operations 1300 of FIG. 13. For example, operations 1400 may be performed by a BS 110 to indicate TBS scaling and/or repetition to a UE performing operations 1300 of FIG. 13.

Operations 1400 begin, at 1402, by receiving, from a user equipment (UE), an indication of at least one of a limited capability of the UE or a request for coverage enhancement for a random access channel (RACH) procedure suitable for the limited capability of the UE.

At 1404, the network entity determines one or more transmission parameters to achieve a reduced coding rate suitable for the limited capability of the UE, for a physical downlink shared channel (PDSCH) subsequent random access (RA) message, received after a random access response (RAR) message, as part of the RACH procedure.

At 1406, the network entity transmits the PDSCH to the UE in accordance with the determined transmission parameters.

Various approaches may be used to indicate the transmission parameters (e.g., TBS scaling and/or repetition factor) for the Msg4 PDSCH.

For example, in some cases a same TBS scaling factor for Msg4 PDSCH as indicated for Msg2 PDSCH. In this case, the UE may apply the same TBS scaling factor indicated in the scheduling DCI for Msg2 PDSCH.

Figure 15:
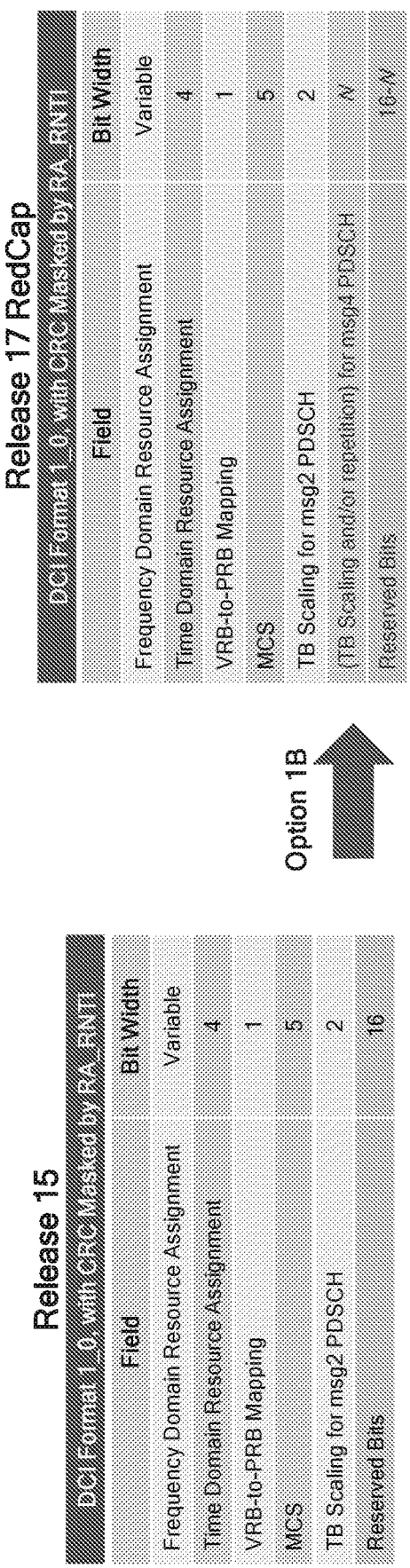
FIG. 15 is a set of tables illustrating repurpose of indication fields for transport block size (TBS), in accordance with certain aspects of the present disclosure.

In some cases, one or more (N) reserved bits of the Msg2 scheduling DCI may be repurposed as indication of transmission parameters (e.g., TBS scaling and/or repetition factor) for Msg4 PDSCH, as shown in FIG. 15.

In some cases, bits of one or more fields of the Msg4 scheduling DCI may be repurposed as indication of transmission parameters, as shown in FIG. 16. For example, one or more bits of a downlink assignment index (DAI) field (labeled as 2A in FIG. 16) and/or an MCS field (labeled as 2B in FIG. 16) may be repurposed. In some cases, the repurposed bits of the MCS field may be the most significant bits (MSBs) because only the low MCS values may be needed due to higher reliability requirement for the transmission. Examples of other fields (bits) that may be repurposed include one or a combination of: a HARQ process ID, TPC (transmit power control) for PUCCH, PUCCH resource indicator, or PDSCH-to-HARQ_feedback timing indicator.

In some cases, the associated indication of TPC, PUCCH resource indicator, and/or PDSCH-to-HARQ_feedback timing indicator can instead be carried in Msg4 PDSCH rather than its scheduling PDCCH. This may allow these bits to be repurposed and this approach may be motivated by the potential to free more bits for these indications, for example, to use the PUCCH resource indictor if PUCCH repetition for HARQ feedback is needed and/or to use bits of the PDSCH-to-HARQ_feedback timing indicator if timeline relaxation for HARQ feedback allows more possible PDSCH-to-HARQ_feedback offsets. It is also possible that TPC for PUCCH may not be needed by deterministic full power transmission for HARQ feedback PUCCH.

There are various options for a UE to indicate its support for transmission parameter signaling proposed herein. For example, according to one option, the UE may report reduced capabilities or request coverage enhancements via Msg1 (RACH preamble). According to another option, the UE may report reduced capabilities or request coverage enhancements via Msg3. In addition to reporting reduced capabilities or requesting coverage enhancement, the UE can also transmit a channel state information (CSI) report in Msg3, which may assist the gNB in determining the TBS scaling factor and/or repetition number for Msg4.

In some cases, the gNB can indicate to the UE whether to enable or disable the low-CE MCS table for Msg4 via a SIB (e.g., SIB1). If enabled by the gNB, the UE can indicate its capability (e.g., for the low-SE MCS table shown in FIG. 10B) for Msg4 either via a RACH preamble (Msg1) or Msg3.

In some cases, the gNB can further indicate whether the low-SE MCS table is used for Msg4 PDSCH (and/or repetition) via a Msg4 DCI. For example, as shown in FIG. 17, according to a first alternative (Alt 1) bits in a DAI field in Msg4 DCI may be repurposed to indicate repetition (which can be associated with either the regular MCS table or the low-SE MCS table). As shown in FIG. 17, according to a second alternative (Alt 2), the repurposed bits may be used to jointly indicate the MCS table and the repetition.

Figure 18:
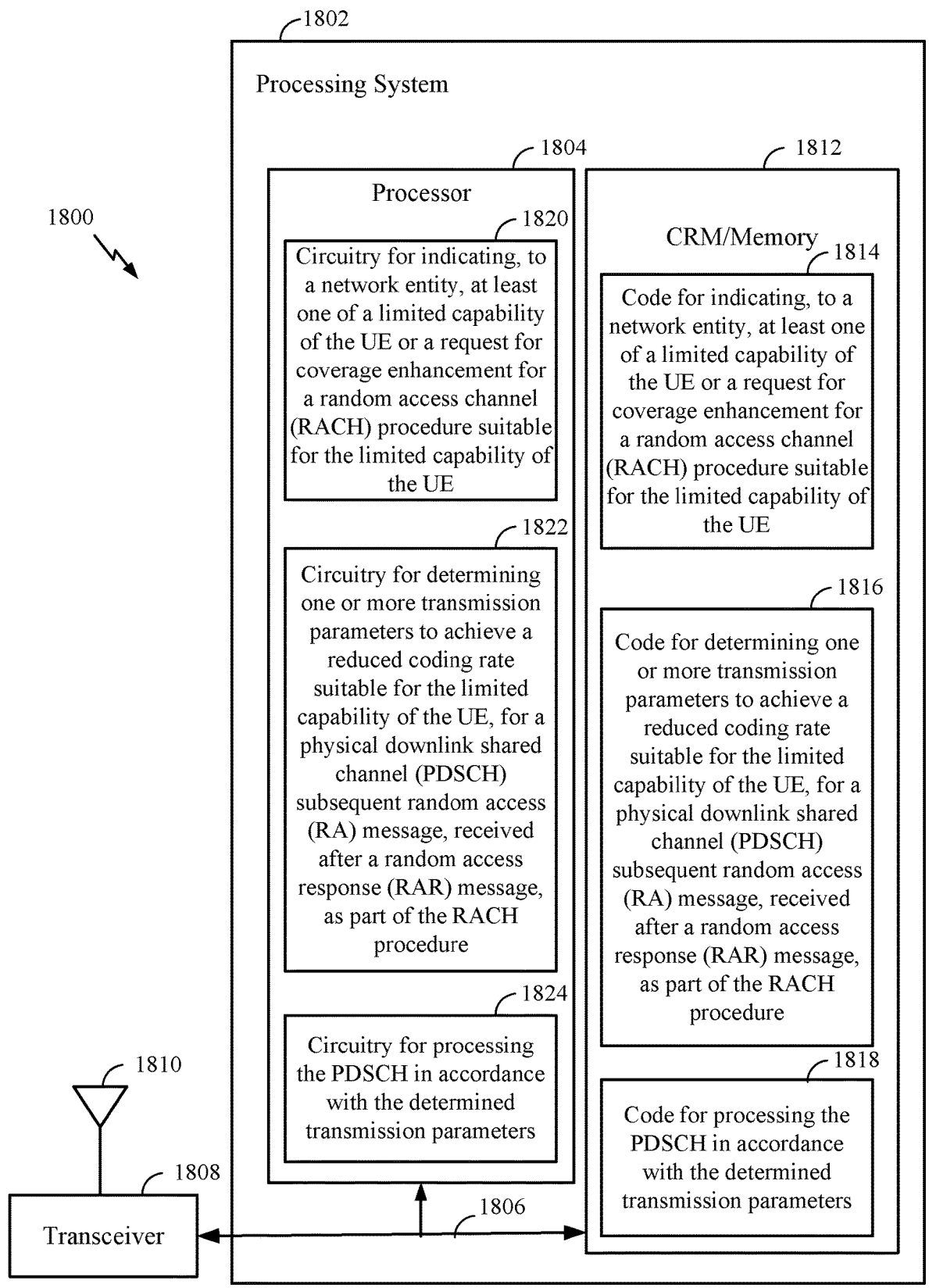
FIG. 18 illustrates a communications device that may include various components configured to perform operations for the techniques disclosed herein in accordance with aspects of the present disclosure.

FIG. 18 illustrates a communications device 1800 that may include various components (e.g., corresponding to means-plus-function components) configured to perform operations for the techniques disclosed herein, such as the operations illustrated in FIG. 13. The communications device 1800 includes a processing system 1802 coupled to a transceiver 1808. The transceiver 1808 is configured to transmit and receive signals for the communications device 1800 via an antenna 1810, such as the various signals as described herein. The processing system 1802 may be configured to perform processing functions for the communications device 1800, including processing signals received and/or to be transmitted by the communications device 1800.

The processing system 1802 includes a processor 1804 coupled to a computer-readable medium/memory 1812 via a bus 1806. In certain aspects, the computer-readable medium/memory 1812 is configured to store instructions (e.g., computer-executable code) that when executed by the processor 1804, cause the processor 1804 to perform the operations illustrated in FIG. 13, or other operations for performing the various techniques discussed herein. In certain aspects, computer-readable medium/memory 1812 stores code 1814 for indicating, to a network entity, at least one of a limited capability of the UE or a request for coverage enhancement for a random access channel (RACH) procedure suitable for the limited capability of the UE, code 1816 for determining one or more transmission parameters to achieve a reduced coding rate suitable for the limited capability of the UE, for a physical downlink shared channel (PDSCH) subsequent random access (RA) message, received after a random access response (RAR) message, as part of a random access channel (RACH) procedure, and code 1818 for processing the PDSCH in accordance with the determined transmission parameters. In certain aspects, the processor 1804 has circuitry configured to implement the code stored in the computer-readable medium/memory 1812. The processor 1804 includes circuitry 1820 for indicating, to a network entity, at least one of a limited capability of the UE or a request for coverage enhancement for a random access channel (RACH) procedure suitable for the limited capability of the UE, circuitry 1822 for determining one or more transmission parameters to achieve a reduced coding rate suitable for the limited capability of the UE, for a physical downlink shared channel (PDSCH) subsequent random access (RA) message, received after a random access response (RAR) message, as part of a random access channel (RACH) procedure, and circuitry 1824 for processing the PDSCH in accordance with the determined transmission parameters.

Figure 19:
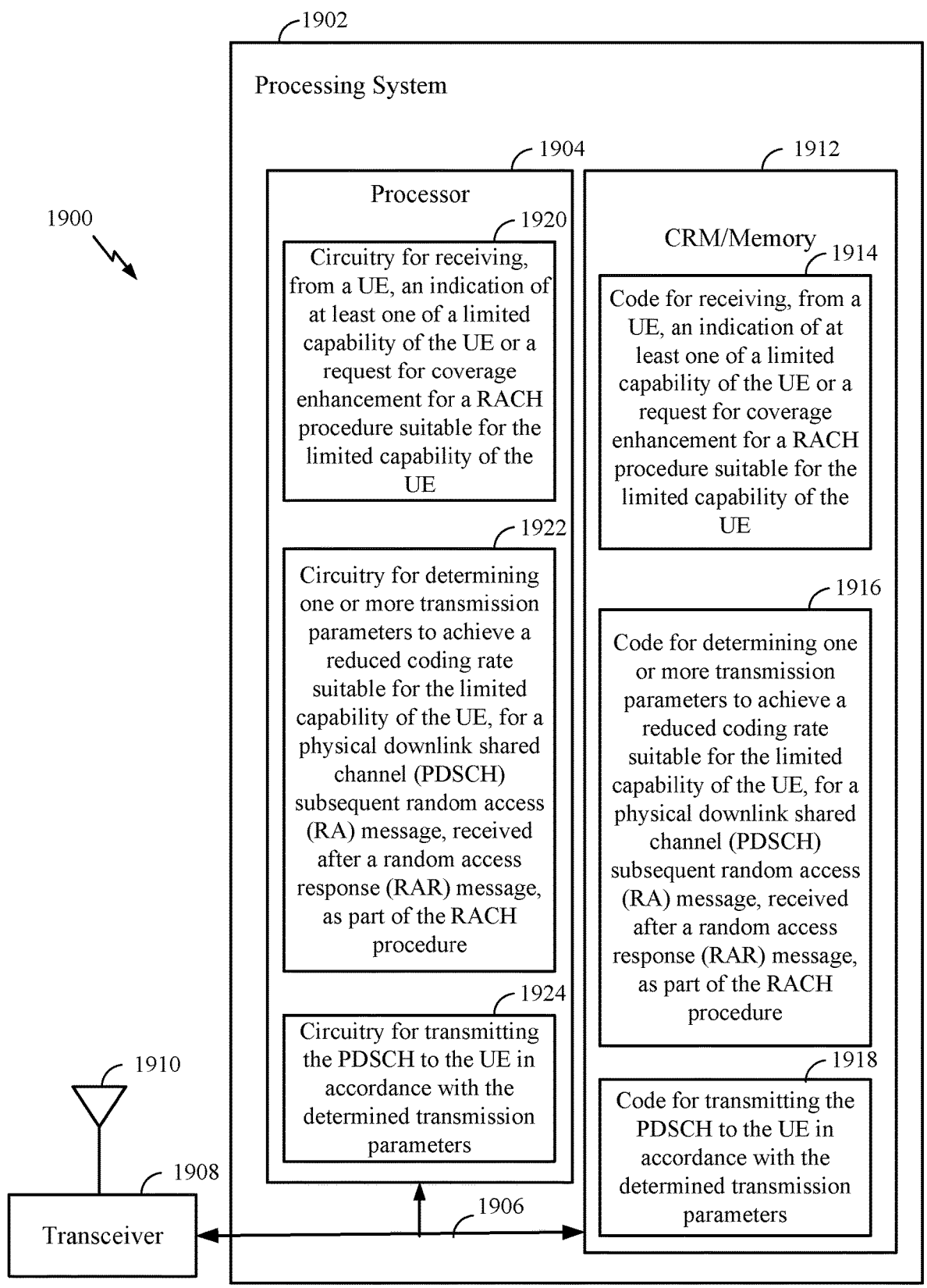
FIG. 19 illustrates a communications device that may include various components configured to perform operations for the techniques disclosed herein in accordance with aspects of the present disclosure.

FIG. 19 illustrates a communications device 1900 that may include various components (e.g., corresponding to means-plus-function components) configured to perform operations for the techniques disclosed herein, such as the operations illustrated in FIG. 14. The communications device 1900 includes a processing system 1902 coupled to a transceiver 1908. The transceiver 1908 is configured to transmit and receive signals for the communications device 1900 via an antenna 1910, such as the various signals as described herein. The processing system 1902 may be configured to perform processing functions for the communications device 1900, including processing signals received and/or to be transmitted by the communications device 1900.

The processing system 1902 includes a processor 1904 coupled to a computer-readable medium/memory 1912 via a bus 1906. In certain aspects, the computer-readable medium/memory 1912 is configured to store instructions (e.g., computer-executable code) that when executed by the processor 1904, cause the processor 1904 to perform the operations illustrated in FIG. 14, or other operations for performing the various techniques discussed herein. In certain aspects, computer-readable medium/memory 1912 stores code 1914 for receiving, from a user equipment (UE), an indication of at least one of a limited capability of the UE or a request for coverage enhancement for a random access channel (RACH) procedure suitable for the limited capability of the UE, code 1916 for determining one or more transmission parameters to achieve a reduced coding rate suitable for the limited capability of the UE, for a physical downlink shared channel (PDSCH) subsequent random access (RA) message, received after a random access response (RAR) message, as part of the RACH procedure, and code 1918 for transmitting the PDSCH to the UE in accordance with the determined transmission parameters. In certain aspects, the processor 1904 has circuitry configured to implement the code stored in the computer-readable medium/memory 1912. The processor 1904 includes circuitry 1920 for receiving, from a user equipment (UE), an indication of at least one of a limited capability of the UE or a request for coverage enhancement for a random access channel (RACH) procedure suitable for the limited capability of the UE, circuitry 1922 for determining one or more transmission parameters to achieve a reduced coding rate suitable for the limited capability of the UE, for a physical downlink shared channel (PDSCH) subsequent random access (RA) message, received after a random access response (RAR) message, as part of the RACH procedure, and circuitry 1924 for transmitting the PDSCH to the UE in accordance with the determined transmission parameters.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 13 or 14.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above.

Various modifications, changes and variations may be made in the arrangement, operation and details of the methods and apparatus described above without departing from the scope of the claims.

The invention claimed is:

1. An apparatus for wireless communications by a user equipment (UE), the apparatus comprising:
   at least one memory comprising computer executable code; and
   one or more processors configured to cause the apparatus to:
     indicate, to a network entity, at least one of a limited capability of the UE or a request for coverage enhancement for a random access channel (RACH) procedure for the UE of the limited capability;
     determine one or more transmission parameters to achieve a reduced coding rate for the UE of the limited capability, for a physical downlink shared channel (PDSCH) subsequent random access (RA) message, received after a random access response (RAR) message, as part of the RACH procedure; and
     process the PDSCH in accordance with the one or more transmission parameters.

2. The apparatus of claim 1, wherein:
   the one or more transmission parameters comprise at least one of a transport block size (TBS) scaling factor or a repetition factor to be applied for the PDSCH; and
   the one or more processors are configured to cause the apparatus to indicate the least one of the TBS scaling factor or the repetition factor via a downlink control information (DCI) scheduling the RAR message.

3. The apparatus of claim 2, wherein the DCI scheduling the RAR message indicates a same TBS scaling factor for the PDSCH as for the RAR message.

4. The apparatus of claim 3, wherein:
   the DCI scheduling the RAR message comprises one or more bits indicating the at least one of the TBS scaling factor or the repetition factor to be applied for the PDSCH; and
   the one or more bits comprise one or more reserved bits of the DCI scheduling the RAR message.

5. The apparatus of claim 1, wherein:
   the one or more transmission parameters comprise a transport block size (TBS) scaling factor to be applied for the PDSCH; and
   the one or more processors are configured to cause the apparatus to indicate the TBS scaling factor via a downlink control information (DCI) scheduling the PDSCH.

6. The apparatus of claim 5, wherein the one or more processors are configured to cause the apparatus to indicate the TBS scaling factor via at least one of one or more bits of a downlink assignment index (DAI) field of the DCI or one or more bits of a modulation and coding scheme (MCS) field of the DCI.

7. The apparatus of claim 6, wherein the PDSCH indicates one or more of:
   a transmit power control (TPC) for a physical uplink control channel (PUCCH) for providing hybrid automatic repeat request (HARQ) feedback for the PDSCH;
   a resource indicator for the PUCCH; or
   a timing indicator for providing the HARQ feedback.

8. The apparatus of claim 1, wherein:
   the one or more transmission parameters comprise at least one of a transport block size (TBS) scaling factor or a repetition factor to be applied for the PDSCH; and the one or more processors are configured to cause the apparatus to indicate the one or more transmission parameters via repurposed bits of one or more of:
- a hybrid automatic repeat request (HARQ) process identifier (ID);
- a transmit power control (TPC) for a physical uplink control channel (PUCCH) for providing HARQ feedback for the PDSCH;
- a resource indicator for the PUCCH; or
- a timing indicator for providing the HARQ feedback of a downlink control information (DCI).

9. The apparatus of claim 1, wherein the one or more processors are configured to cause the apparatus to indicate the at least one of the limited capability of the UE or the request for coverage enhancement via a RACH preamble message.

10. The apparatus of claim 1, wherein the one or more processors are configured to cause the apparatus to indicate the at least one of the limited capability of the UE or the request for coverage enhancement via an uplink message sent after receiving the RAR message.

11. The apparatus of claim 10, wherein the one or more processors are configured to cause the apparatus to provide channel state information (CSI) in the uplink message.

12. The apparatus of claim 1, wherein the one or more processors are configured to cause the apparatus to receive, from the network entity, an indication to enable or disable use of a low spectral efficiency (SE) modulation and coding scheme (MCS) table for the PDSCH.

13. The apparatus of claim 12, wherein the one or more processors are configured to cause the apparatus to indicate a capability of the UE to support the low SE MCS table for the PDSCH.

14. The apparatus of claim 12, wherein the one or more processors are configured to cause the apparatus to provide the indication to enable or disable the use of the low SE MCS table for the PDSCH via a system information block (SIB).

15. The apparatus of claim 12, wherein the one or more processors are configured to cause the apparatus to provide the indication to enable or disable the use of the low SE MCS table for the PDSCH via a downlink control information (DCI) scheduling the PDSCH.

16. The apparatus of claim 15, wherein the one or more processors are configured to cause the apparatus to provide the indication to enable or disable the use of the low SE MCS table for the PDSCH via one or more bits of a downlink assignment index (DAI) field of the DCI, the one or more bits repurposed to at least one of:
- indicate a repetition associated with either a regular MCS table or the low SE MCS table; or
- jointly indicate the repetition and which of the regular or low SE MCS table to use.

17. An apparatus for wireless communications by a network entity, the apparatus comprising:
- at least one memory comprising computer executable code; and
- one or more processors configured to cause the apparatus to:
  - receive, from a user equipment (UE), an indication of at least one of a limited capability of the UE or a request for coverage enhancement for a random access channel (RACH) procedure for the UE of the limited capability;
  - determine one or more transmission parameters to achieve a reduced coding rate for the UE of the limited capability, for a physical downlink shared channel (PDSCH) subsequent random access (RA) message, received after a random access response (RAR) message, as part of the RACH procedure; and
  - transmit the PDSCH to the UE in accordance with the one or more transmission parameters.

18. The apparatus of claim 17, wherein:
- the one or more transmission parameters comprise at least one of a transport block size (TBS) scaling factor or a repetition factor to be applied for the PDSCH; and
- the TBS scaling factor or the repetition factor is indicated via a downlink control information (DCI) scheduling the RAR message.

19. The apparatus of claim 18, wherein the DCI scheduling the RAR message indicates a same TBS scaling factor for the PDSCH as for the RAR message.

20. The apparatus of claim 19, wherein the DCI scheduling the RAR message comprises one or more bits indicating the at least one of TBS scaling factor or the repetition factor to be applied for the PDSCH by repurposing one or more bits of reserved bits of the DCI scheduling the RAR message.

21. The apparatus of claim 17, wherein:
- the one or more transmission parameters comprise a transport block size (TBS) scaling factor to be applied for the PDSCH; and
- the TBS scaling factor is indicated via a downlink control information (DCI) scheduling the PDSCH.

22. The apparatus of claim 21, wherein the indication is provided via at least one of: one or more bits of a downlink assignment index (DAI) field or one or more bits of a modulation and coding scheme (MCS) field of the DCI.

23. The apparatus of claim 22, wherein the PDSCH indicates one or more of:
- a transmit power control (TPC) for a physical uplink control channel (PUCCH) for providing hybrid automatic repeat request (HARQ) feedback for the PDSCH;
- a resource indicator for the PUCCH; or
- a timing indicator for providing the HARQ feedback.

24. The apparatus of claim 17, wherein:
- the one or more transmission parameters comprise at least one of a transport block size (TBS) scaling factor or a repetition factor to be applied for the PDSCH; and
- the one or more transmission parameters are indicated by repurposing bits of one or more of:
  - a hybrid automatic repeat request (HARQ) process ID;
  - a transmit power control (TPC) for a physical uplink control channel (PUCCH) for providing HARQ feedback for the PDSCH;
  - a resource indicator for the PUCCH; or
  - a timing indicator for providing the HARQ feedback of a downlink control information (DCI).

25. The apparatus of claim 17, wherein the at least one of the limited capability of the UE or the request for coverage enhancement is indicated via a RACH preamble message.

26. The apparatus of claim 17, wherein the at least one of the limited capability of the UE or the request for coverage enhancement is indicated via an uplink message sent after the RAR message.

27. The apparatus of claim 26, wherein the one or more processors are configured to cause the apparatus to receive channel state information (CSI) in the uplink message.

28. The apparatus of claim 17, wherein the one or more processors are configured to cause the apparatus to send, to the UE, an indication to enable or disable use of a low spectral efficiency (SE) modulation and coding scheme (MCS) table for the PDSCH.

29. The apparatus of claim 28, wherein the one or more processors are configured to cause the apparatus to receive, from the UE, an indication of a capability of the UE to support the low SE MCS table for the PDSCH.

30. The apparatus of claim 28, wherein the indication to enable or disable use of the low SE MCS table for the PDSCH is sent via a system information block (SIB).

31. The apparatus of claim 28, wherein the indication to enable or disable use of the low SE MCS table for the PDSCH is sent via a downlink control information (DCI) scheduling the PDSCH.

32. The apparatus of claim 31, wherein the indication to enable or disable use of the low SE MCS table for the PDSCH is provided via one or more bits of a downlink assignment index (DAI) field of the DCI repurposed to at least one of:
   indicate a repetition associated with either a regular MCS table or the low SE MCS table; or
   jointly indicate the repetition and which of the regular or low SE MCS table to use.

33. A method for wireless communications by a user equipment (UE), the method comprising:
   indicating, to a network entity, at least one of a limited capability of the UE or a request for coverage enhancement for a random access channel (RACH) procedure suitable for the limited the UE of the limited capability;
   determining one or more transmission parameters to achieve a reduced coding rate for the UE of the limited capability, for a physical downlink shared channel (PDSCH) subsequent random access (RA) message, received after a random access response (RAR) message, as part of the RACH procedure; and processing the PDSCH in accordance with the one or more transmission parameters.

34. A method for wireless communications by a network entity, the method comprising:
   receiving, from a user equipment (UE), an indication of at least one of a limited capability of the UE or a request for coverage enhancement for a random access channel (RACH) procedure for the UE of the limited capability;
   determining one or more transmission parameters to achieve a reduced coding rate for the UE of the limited capability, for a physical downlink shared channel (PDSCH) subsequent random access (RA) message, received after a random access response (RAR) message, as part of the RACH procedure; and
   transmitting the PDSCH to the UE in accordance with the one or more transmission parameters.

35. A non-transitory computer readable medium having instructions stored thereon for:
   indicating, to a network entity, at least one of a limited capability of a user equipment (UE) or a request for coverage enhancement for a random access channel (RACH) procedure for the UE of the limited capability;
   determining one or more transmission parameters to achieve a reduced coding rate for of the UE of the limited capability, for a physical downlink shared channel (PDSCH) subsequent random access (RA) message, received after a random access response (RAR) message, as part of the RACH procedure; and
   processing the PDSCH in accordance with the one or more transmission parameters.

\* \* \* \* \*